(12) United States Patent
Blakeley, III

(10) Patent No.: US 8,727,608 B2
(45) Date of Patent: May 20, 2014

(54) MOISTURE METER WITH NON-CONTACT INFRARED THERMOMETER

(75) Inventor: Gerald W. Blakeley, III, Lincoln, MA (US)

(73) Assignee: FLiR Systems, Inc., Wilsonville, OR (US)

( * ) Notice: Subject to any disclaimer, the term of this patent is extended or adjusted under 35 U.S.C. 154(b) by 380 days.

(21) Appl. No.: 11/841,036

(22) Filed: Aug. 20, 2007

(65) Prior Publication Data

US 2008/0259993 A1 Oct. 23, 2008

Related U.S. Application Data

(63) Continuation-in-part of application No. 11/189,122, filed on Jul. 25, 2005, now Pat. No. 7,452,127, and a continuation-in-part of application No. 11/039,653, filed on Jan. 19, 2005, now Pat. No. 7,168,316, and a continuation-in-part of application No. 10/911,177, filed on Aug. 4, 2004, now Pat. No. 7,111,981, and a continuation-in-part of application No. 10/910,894, filed on Aug. 4, 2004, now Pat. No. 7,163,336, and a continuation-in-part of application No. 10/654,851, filed on Sep. 4, 2003, now Pat. No. 7,056,012.

(51) Int. Cl.
*G01N 25/00* (2006.01)
*G01K 1/02* (2006.01)

(52) U.S. Cl.
USPC ............. 374/16; 374/120; 374/28; 374/45; 374/141

(58) Field of Classification Search
USPC ............ 374/16, 17–20, 27–28, 100.12–121, 374/130–131, 161, 163, 183, 141, 45, 109, 374/208, 185, 14, 142; 73/73
See application file for complete search history.

(56) References Cited

U.S. PATENT DOCUMENTS

| 4,035,644 | A | * | 7/1977 | Ciemochowski | 250/340 |
|---|---|---|---|---|---|
| 4,877,329 | A | * | 10/1989 | Sauerbaum et al. | 374/28 |
| 5,042,294 | A | * | 8/1991 | Uzzell | 73/75 |
| 6,095,682 | A | * | 8/2000 | Hollander et al. | 374/121 |
| 6,126,311 | A | * | 10/2000 | Schuh | 374/21 |
| 6,442,953 | B1 | * | 9/2002 | Trigiani et al. | 62/130 |
| 6,553,813 | B2 | * | 4/2003 | Rynhart et al. | 73/73 |

(Continued)

FOREIGN PATENT DOCUMENTS

| GB | 2190203 A | * 11/1987 |
|---|---|---|
| GB | 2288878 A | * 11/1995 |

(Continued)

*Primary Examiner* — Gail Verbitsky
(74) *Attorney, Agent, or Firm* — Haynes and Boone, LLP

(57) ABSTRACT

A moisture meter with non-contact temperature measurement capability having a housing, a moisture-detecting device coupled to or contained at least partially in the housing, and having an output related to measured moisture parameters, a non-contact, optically-based temperature sensing device coupled to the housing, having an output related to sensed temperature, an output display contained in the housing, for displaying measurements to a user, and circuitry contained in the housing for processing both the moisture-detecting device output and the non-contact temperature sensing device output, and transmitting the processed outputs to the output display. The moisture-detecting device can be either one or both of a contact-type moisture-detecting device such as a pad on the rear side of the housing, and a pin-type moisture-detecting device in a hand-held probe, and electrically coupled to the circuitry in the housing through a cord.

14 Claims, 4 Drawing Sheets

(56) References Cited

U.S. PATENT DOCUMENTS

| | | |
|---|---|---|
| 6,805,899 B2 * | 10/2004 | MacHattie et al. ............ 427/8 |
| 6,972,395 B2 * | 12/2005 | Jones ............................ 219/213 |
| 7,056,012 B2 | 6/2006 | Blakeley |
| 7,168,316 B2 | 1/2007 | Blakeley |
| 7,181,953 B1 * | 2/2007 | Street ............................ 73/29.05 |
| 7,197,927 B2 * | 4/2007 | Stauss et al. ............... 73/335.02 |
| 7,234,313 B2 * | 6/2007 | Bell et al. ........................ 62/129 |
| 7,249,493 B2 * | 7/2007 | Kellerman et al. ............... 73/73 |
| 7,332,716 B2 * | 2/2008 | Hamrelius et al. ............ 250/332 |
| 7,334,938 B2 * | 2/2008 | Remsburg ..................... 374/109 |
| 7,400,975 B2 * | 7/2008 | Glenn et al. ...................... 702/2 |
| 7,416,331 B2 * | 8/2008 | Ruttiger et al. ................ 374/142 |
| 7,584,652 B2 * | 9/2009 | Floyd et al. ........................ 73/73 |
| 2003/0198277 A1 * | 10/2003 | Liao ............................... 374/208 |
| 2007/0171955 A1 * | 7/2007 | Kanai et al. ..................... 374/28 |
| 2009/0304041 A1 * | 12/2009 | Streicher et al. ................ 374/28 |

FOREIGN PATENT DOCUMENTS

| | | | |
|---|---|---|---|
| JP | 58018155 A | * | 2/1983 |
| JP | 62000846 A | * | 1/1987 |
| JP | 0200310690 A | * | 4/2003 |
| WO | WO 2004083837 A | * | 9/2005 |
| WO | WO 2007131998 A1 | * | 11/2007 |

\* cited by examiner

MOISTURE METER WITH NON-CONTACT INFRARED THERMOMETER

RELATED U.S. PATENT AND APPLICATION DATA

The present application is a Continuation-in-Part of and claims the benefit of non-provisional U.S. patent application Ser. No. 11/189,122, "Anemometer with Non-Contact Temperature Measurement," filed Jul. 25, 2005, now U.S. Pat. No. 7,452,127;

U.S. patent application Ser. No. 11/189,122 is a Continuation-in-Part of and claims the benefit of U.S. patent application Ser. No. 11/039,653, "Humidity Meter with Non-Contact Temperature Measurement," filed Jan. 19, 2005, now U.S. Pat. No. 7,168,316;

U.S. patent application Ser. No. 11/189,122 is also a Continuation-in-Part of and claims the benefit of U.S. patent application Ser. No. 10/910,894, "Instrument for Non-Contact Infrared, Temperature Measurement Having Current Clamp Meter Functions," filed Aug. 4, 2004 now U.S. Pat. No. 7,163,336;

U.S. patent application Ser. No. 11/189,122 is also a Continuation-in-Part of and claims the benefit of U.S. patent application Ser. No. 10/911,177, "Instrument for Non-Contact Infrared Temperature Measurement Combined with Tachometer Functions," filed Aug. 4, 2004, now U.S. Pat. No. 7,111,981; and U.S. patent application Ser. No. 11/189,122 is also a Continuation-in-Part of and claims the benefit of U.S. patent application Ser. No. 10/654,851, "Multimeter with Non-Contact Temperature Measurement," filed Sep. 4, 2003, now U.S. Pat. No. 7,056,012.

The present application claims priority to the parent and all the grandparent applications under 35 U.S.C. §120.

FIELD OF THE INVENTION

This invention relates to a moisture meter that is typically used for measuring moisture and related parameters such as temperature and relative humidity, also having non-contact infrared (IR) temperature measurement capabilities.

BACKGROUND OF THE INVENTION

There are many situations in which technicians and others need to accomplish both non-contact temperature measurement along with measurement of moisture and related parameters. Moisture meters are typically used to measure parameters including (but not necessarily limited to) moisture, relative humidity (RH) and ambient temperature. The ambient temperature-measuring sensor is usually located in the same enclosure as the humidity-measuring sensor in order to be able to determine the ambient temperature and other parameters. However, this prevents or reduces the ability to use the temperature-measuring device to make a contact-type temperature measurement. In addition, very often there is a need to measure surface temperatures of surfaces that cannot be easily accessed with a contact type-measuring device. Present practices thus require the use of two different instruments, typically a moisture meter and a thermometer or pyrometer, to perform both moisture measurement and surface temperature measurement tasks.

SUMMARY OF THE INVENTION

It is therefore an object of this invention to provide an instrument that can be used to measure both moisture parameters and remote temperature. Many of the functions of these measurements, such as the display, power supply, housing, and analog to digital converter, can be common to both the moisture meter and the surface temperature measurement functionality. With this invention, portability is improved by only having to carry one instrument for use in the field. To further simplify use for quick field measurements, in a preferred embodiment there is no need to relocate the moisture enclosure from the temperature measurement function.

This invention features a moisture meter with non-contact temperature measurement capability in a housing, a moisture-detecting device coupled to or contained at least partially in the housing, and having an output related to measured moisture parameters, a non-contact, optically-based temperature sensing device coupled to the housing, having an output related to sensed temperature, an output display contained in the housing, for displaying measurements to a user, and circuitry contained in the housing for processing both the moisture-detecting device output and the non-contact temperature sensing device output, and transmitting the processed outputs to the output display. The moisture-detecting device can be either one or both of a contact-type moisture-detecting device such as a pad on the rear side of the housing, and a pin-type moisture-detecting device in a hand-held probe, and electrically coupled to the circuitry in the housing through a cord.

The moisture meter may further comprise an ambient temperature sensor with an output, and/or an ambient humidity sensor with an output. The ambient temperature and humidity sensors may be located internally or in a probe that extends from and is fixed to the end of the housing. The non-contact temperature-sensing device may comprise an infrared sensor. The non-contact temperature-sensing device may further comprise a lens, proximate the infrared sensor, for focusing entering radiation onto the infrared sensor. The non-contact temperature-sensing device may define a sense axis that is fixed relative to the housing. The moisture meter may further comprise an optical aiming device coupled to the housing, to assist the user in aiming the non-contact temperature-sensing device at an object whose temperature is to be measured. The optical aiming device may comprise a diode laser device.

The moisture meter may further comprise a switch for switching at least some of the circuitry between the moisture-detecting device output and the non-contact temperature-sensing device output, and a user-operable electrical device for selectively routing the temperature-sensing device output to the circuitry, and user-operable electrical device for selectively holding the sensed non-contact temperature.

Featured in another embodiment is a moisture meter with non-contact temperature measurement capability, comprising a contact-type first moisture-detecting device contained at least partially in a housing and having an output related to measured moisture parameters, a penetrating pin-type second moisture-detecting device in a hand-held probe that is separate from the housing and is connected to the housing by a cord to make electrical contact with circuitry in the housing, the second moisture-detecting device having an output related to measured moisture parameters, an ambient temperature sensor and an ambient humidity sensor located in a probe that is coupled to and extends from the housing, a non-contact, infrared sensor temperature sensing device coupled to the housing, having an output related to sensed temperature, an optical aiming device coupled to the housing, to assist the user in aiming the non-contact temperature-sensing device at an object whose temperature is to be measured, an output display contained in the housing, for displaying measurements to a user, and circuitry contained in the housing for processing both of the moisture device outputs, and the humidity and the temperature sensing device outputs, and transmitting the processed outputs to the output display. The non-contact temperature-sensing device may define a sense axis that is fixed relative to the housing. The housing may have a rear side, and the contact-type first moisture-detecting device may comprise a pad on the rear side of the housing.

BRIEF DESCRIPTION OF THE DRAWINGS

Other objects, features and advantages will occur to those skilled in the art from the following description of the preferred embodiments, and the accompanying drawings, in which.

DESCRIPTION OF THE PREFERRED EMBODIMENT OF THE INVENTION

In the invention, the common functions required for processing of signals from an infrared (IR) temperature sensor, a digital moisture meter, a humidity sensor and a temperature sensor, are accomplished by common circuitry, and a common display and other parts as described herein.

Figure 1:
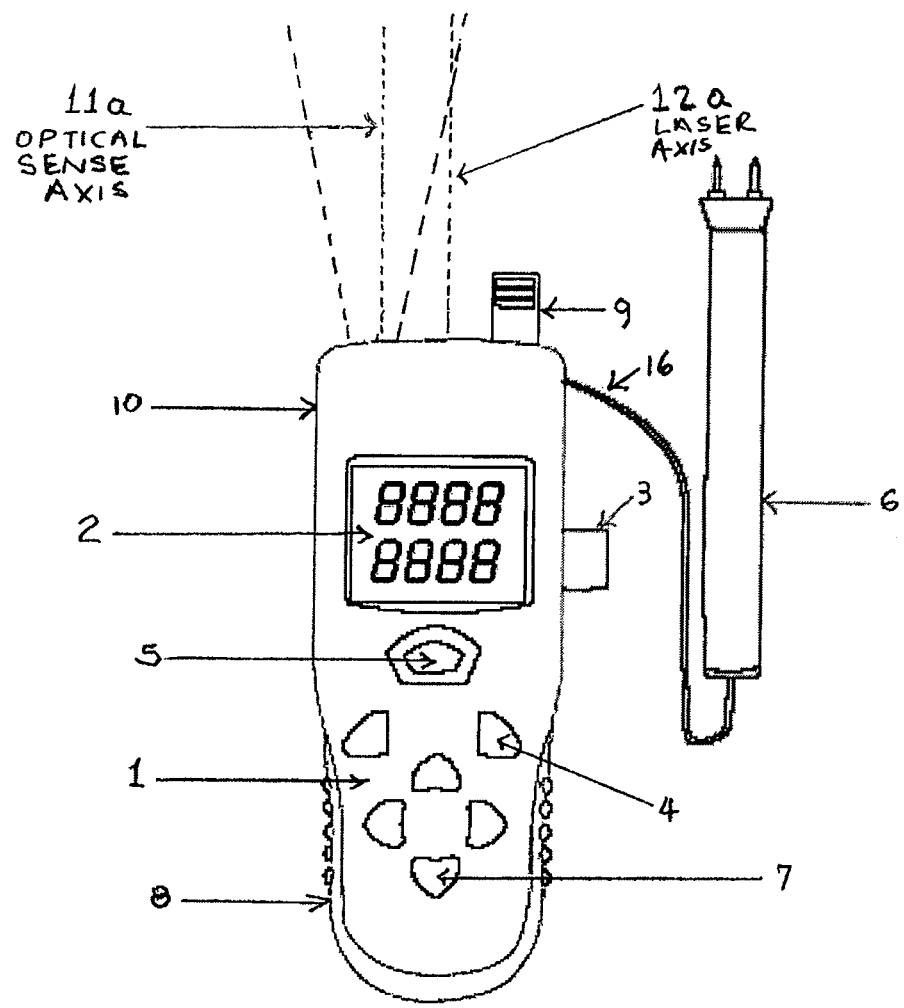
FIG. 1 is a front view of a preferred embodiment of the moisture meter according to this invention.

A typical mechanical arrangement of moisture meter 10 of the invention is shown in FIGS. 1-4. FIG. 1 is a front view of a typical arrangement consisting of a housing or case 1 that contains the circuitry in a convenient hand-held unit, with a dual readout digital display 2 for reading the values being measured. Pushbutton switches 4 allow the user to select one of a multiplicity of functions with a multiplicity of ranges. Pushbutton switches 4 perform further selection of parameters or functions, in combination with pushbuttons 7, for example those related to the ambient temperature measurement. Pushbutton switch 5 can be used to turn on the laser-aiming device. In other embodiments, this pushbutton may also be used to control the IR temperature readout, such as holding the temperature reading while the switch is engaged. Other types of keypads, switches and locations may be used.

Since the IR temperature sensor must be pointed at the surface being measured, the display may not be easily viewable by the user while the temperature is being sensed. Thus, it may be desirable that the IR reading be taken and then held on the display for easy reading later, while the IR temperature sensor is pointed away from the surface. Other embodiments may use these pushbuttons in combination, or alone, to achieve the same result. In addition (and not shown in the drawings) slide switches, rotary switches and/or keypads may also be used. A humidity sensor and an ambient temperature sensor are mounted inside enclosure 9, which projects from the top end of housing 1.

Moisture meter 10 includes two means of measuring moisture. The first means of measuring moisture is a pin-type (surface penetrating) moisture-sensing device (resistivity-based) in a hand-held housing 6 that is electrically coupled to housing 1 by cable 16. The portability allows device 6 to be used to take moisture readings in proximity to the user without having to place housing 1 up to and against the material, for example solid materials such as wood. An optional clip 3 may be provided to temporarily secure device 6 to housing 1.

Figure 2:
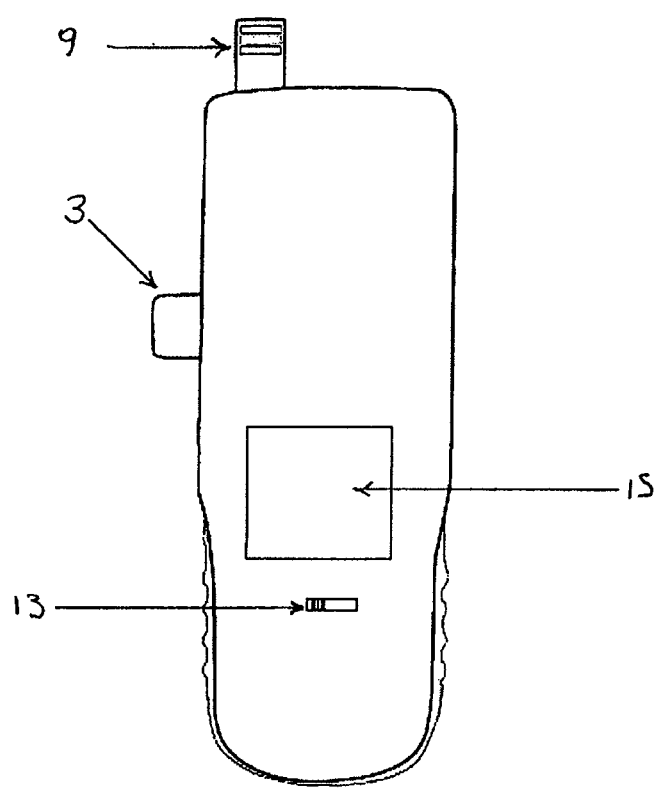
FIG. 2 is a rear view of the device of FIG. 1.

The second means of measuring moisture is with an integral contact pad-type moisture-measuring device 15, shown in FIG. 2, that uses an electric field to make moisture measurements. Pad 15 is located on the rear of housing 1 so that the housing may be placed directly on a material whose moisture is to be measured. Both types of moisture-measuring devices are known in the art. FIG. 2 also shows meter on-off switch 13.

Figure 3:
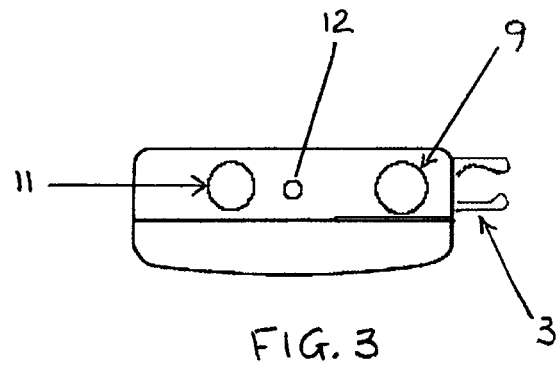
FIG. 3 is a top view of the device of FIGS. 1-2.

FIG. 3 is a top view that shows one arrangement of the infrared (IR) detector 11, used to measure the temperature of a surface of a body without actual contact. It accomplishes this by detecting the IR emissions given off by the object whose surface temperature is being measured. At a specific temperature, the IR emissions from any object vary with its surface conditions, such as finish and color. This variation is a factor called emissivity. Each type of surface has an emissivity ranging from zero to one. The emissivity of a matte black body is one. The emissivity of this embodiment of the invention is fixed, preferably at 0.95, although other emissivities could also be used. Most objects typically being measured have an emissivity reasonably between 0.60 to 0.95. Other embodiments may provide means for adjusting the emissivity to improve the measurement accuracy. FIG. 3 also shows an aperture 12 through which a laser beam or another IR sensor aiming beam may be shone (typically from a laser diode) to assist in aiming the IR temperature measurement apparatus at the surface being measured.

Figure 4:
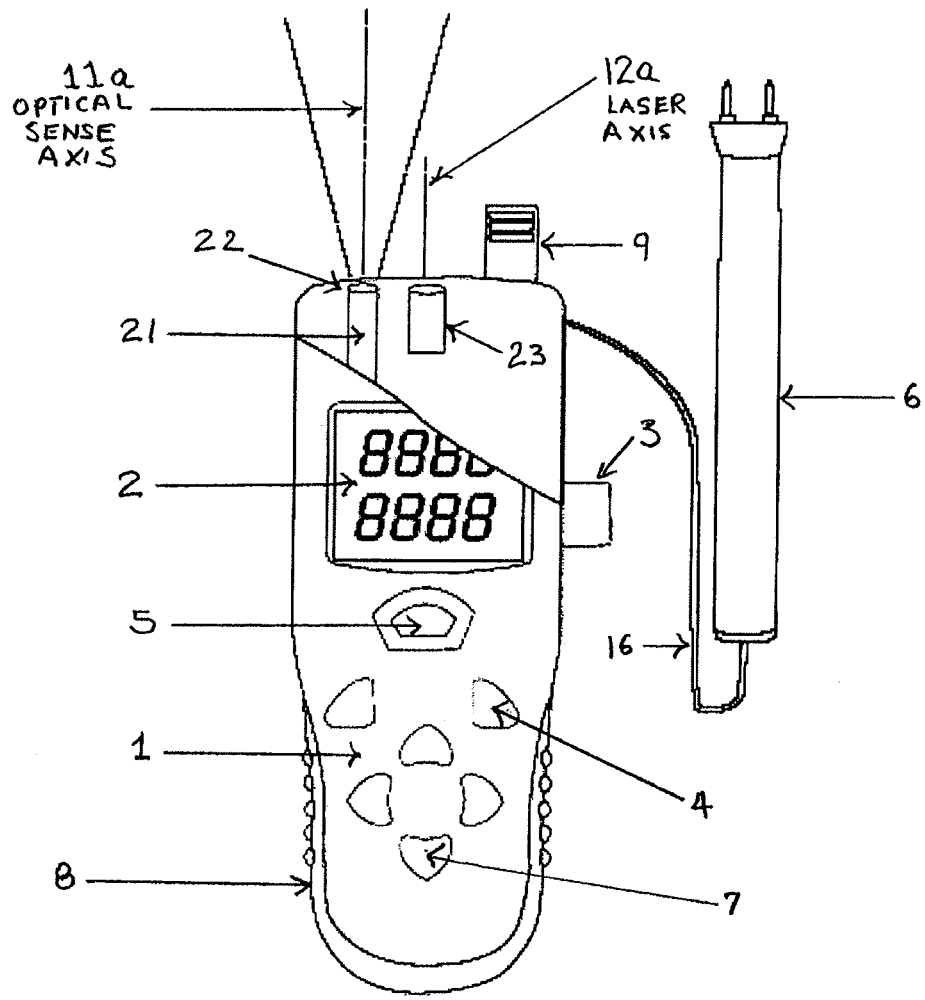
FIG. 4 is a partially cross-sectional front view of the device of FIGS. 1-3.

IR detector 11 sense axis 11a and laser diode beam sense axis 12a are normally fixed at a slight angle to each other to reduce parallax at the surface being measured. FIG. 4 is a partial cross-sectional view from the front of a typical arrangement of IR detector 21, and aiming laser 23. IR detector 21 may be focused, filtered and protected by lens 22. There may also be included with any of the above a protective covering, or double molding 8, preferably made of a softer material to protect against mechanical damage and provide a better hand gripping surface.

Figure 5:
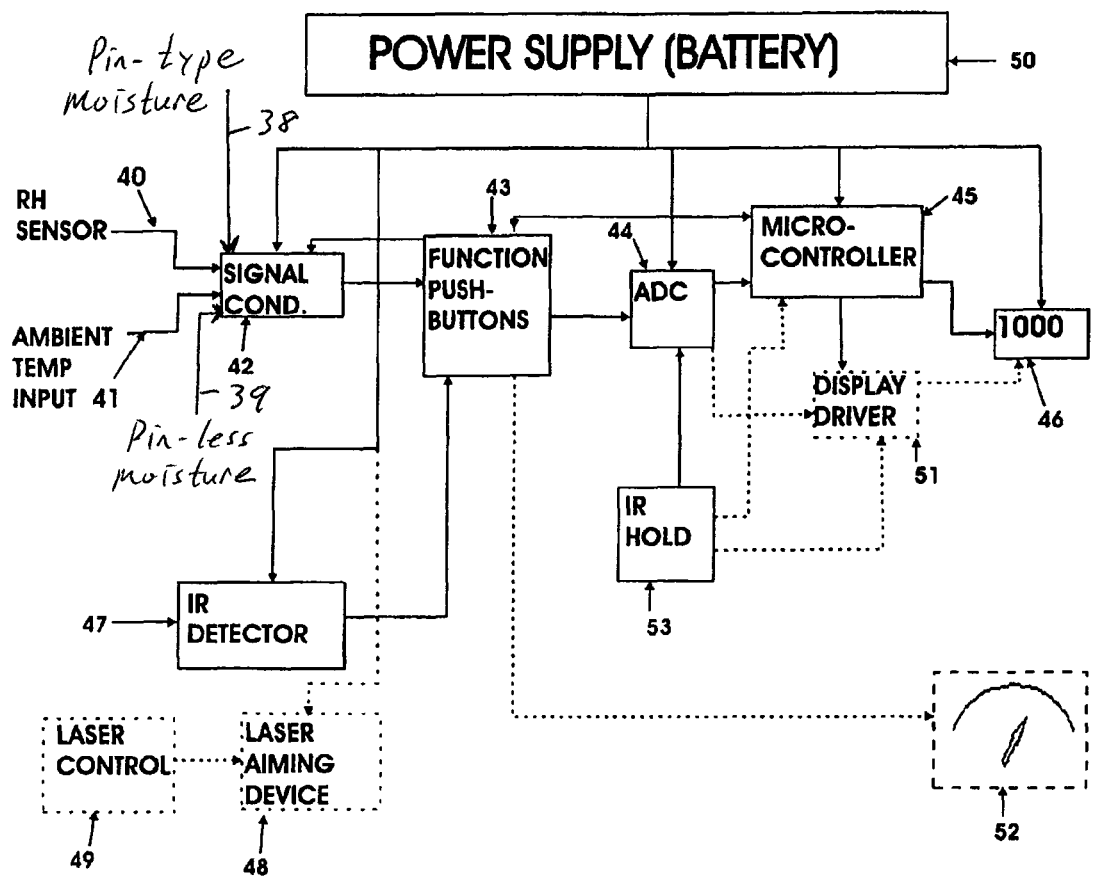
FIG. 5 is a schematic diagram of the circuit functions for the preferred embodiment of the invention.

FIG. 5 is a diagram of the circuit functions of the preferred embodiment, and shows the commonality of the devices shared by both the pin-less (pad-type) moisture sensor input signal 39, pin-type moisture sensor input signal 38, ambient relative humidity sensor input signal 40, and ambient temperature sensor device input signal 41. These input signals are processed by signal conditioning circuits 42, which are selected by pushbuttons 43, under control from micro-controller 45, for presentation to analog to digital converter (ADC) 44. Function pushbuttons 43 may also control the switching of attenuators, gain or other means to convert the measured signal to a more useful one. In alternate embodiments, the signal conditioning function may be located after the function pushbuttons, or divided in front of and between the function pushbuttons and the ADC. The output from ADC 44 may go directly to display drivers 51, which may also be part of ADC devices, or to microcontroller circuit 45. Microcontroller circuit 45 may also contain the ADC and/or display drivers. Digital displays 46 are driven directly from the microcontroller or the display drivers. The outputs can also be transmitted to a remote receiver, for example by wireless transmission or through a connection to an internet-enabled computer.

IR detector circuit 47 is also switched to the ADC by function pushbuttons 43, similar to the moisture meter input signals. Power supply 50, which typically consists of one or multiple batteries and regulating devices, provides power and reference signals as required to all of the functions described above. Other embodiments may provide a laser aiming device 48 and its control circuit 49, an IR hold circuit 53 which will hold the measured remote temperature reading on the display, or may also use an analog display 52 which would not require the use of an ADC or other digital circuits.

Although specific features of the invention are shown in some drawings and not others, this is not a limitation of the invention, as the various features can be combined differently to accomplish the invention. Other embodiments will occur to those skilled in the art and are within the following claims.

What is claimed is:

1. A moisture meter with non-contact temperature measurement capability, comprising:
    a housing;
    a moisture-detecting device for measuring moisture in solid materials selected from the group consisting of a contact-type moisture-detecting device and a pin-type resistivity-based moisture-detecting device, the moisture-detecting device being coupled to or contained at least partially in the housing, and having an output related to measured moisture parameters;
    a non-contact, infrared sensor temperature-sensing device internal to or coupled to the housing, having an output related to a sensed temperature;
    a laser-aiming device coupled to the housing, to assist a user in aiming the non-contact, infrared sensor temperature-sensing device at a location on an object made of solid material whose temperature is to be measured, and to assist the user in using the moisture-detecting device to measure moisture in the object near said location on the object;
    an output display contained in the housing, for displaying measurements to the user; and
    circuitry contained in the housing for processing both the moisture-detecting device output and the non-contact temperature-sensing device output, and for transmitting the processing outputs to the output display.

2. The moisture meter with non-contact temperature measurement capability of claim 1, in which the moisture-detecting device comprises the contact-type moisture-detecting device.

3. The moisture meter with non-contact temperature measurement capability of claim 2, in which the housing has a rear side, and the contact-type moisture-detecting device comprises a pad on the rear side of the housing.

4. The moisture meter with non-contact temperature measurement capability of claim 1, in which the moisture-detecting device comprises the pin-type moisture-detecting device disposed in a hand-held probe, and is electrically coupled to the circuitry in the housing.

5. The moisture meter with non-contact temperature measurement capability of claim 4, in which the pin-type moisture-detecting device comprises a moisture-sensing device that is mounted in an enclosure that is separate from the housing and is connected to the housing by a cord.

6. The moisture meter with non-contact temperature measurement capability of claim 1, further comprising:
    an ambient temperature sensor having an output related temperature; and
    circuitry contained in the housing for processing the ambient temperature sensor output and transmitting the processed output to the display.

7. The moisture meter with non-contact temperature measurement capability of claim 6, in which the ambient temperature sensor is located in a probe that extends from the housing.

8. The moisture meter with non-contact temperature measurement capability of claim 7, in which the housing has an end, and the probe extends from and is fixed to the end of the housing.

9. The moisture meter with non-contact temperature measurement capability of claim 1, in which the non-contact temperature-sensing device further comprises a lens, proximate the infrared sensor, for filtering entering radiation and for focusing entering radiation onto the infrared sensor.

10. The moisture meter with non-contact temperature measurement capability of claim 1, in which the non-contact temperature-sensing device defines a sense axis that is fixed relative to the housing.

11. The moisture meter with non-contact temperature measurement capability of claim 1, in which the laser-aiming device comprises a diode laser device.

12. The moisture meter with non-contact temperature measurement capability of claim 1, further comprising a switch for switching at least some of the circuitry between the moisture-detecting device output and the non-contact temperature-sensing device output.

13. The moisture meter with non-contact temperature measurement capability of claim 1, further comprising a user-operable electrical device for selectively routing the temperature-sensing device output to the circuitry.

14. The moisture meter with non-contact temperature measurement capability of claim 1, further comprising a user-operable electrical device for selectively holding the sensed non-contact temperature.

* * * * *